United States Patent
Scott-Carnell et al.

(10) Patent No.: US 8,378,659 B2
(45) Date of Patent: Feb. 19, 2013

(54) STRUCTURAL HEALTH MONITORING SYSTEM/METHOD USING ELECTROACTIVE POLYMER FIBERS

(75) Inventors: Lisa A. Scott-Carnell, Norfolk, VA (US); Emilie J. Siochi, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 355 days.

(21) Appl. No.: 12/703,221

(22) Filed: Feb. 10, 2010

(65) Prior Publication Data
US 2010/0201384 A1    Aug. 12, 2010

Related U.S. Application Data

(60) Provisional application No. 61/151,535, filed on Feb. 11, 2009.

(51) Int. Cl.
*G01N 27/00* (2006.01)

(52) U.S. Cl. .............. 324/71.1; 324/522; 324/693
(58) Field of Classification Search ............ 324/500, 324/522, 693, 71.1
See application file for complete search history.

(56) References Cited

U.S. PATENT DOCUMENTS

| | | | |
|---|---|---|---|
| 6,809,462 B2 | 10/2004 | Pelrine et al. | |
| 2002/0130673 A1* | 9/2002 | Pelrine et al. | 324/727 |
| 2006/0057377 A1 | 3/2006 | Harrison et al. | |
| 2007/0282378 A1 | 12/2007 | Huang et al. | |
| 2009/0085444 A1* | 4/2009 | Alvarez Icaza Rivera et al. | 310/365 |

* cited by examiner

*Primary Examiner* — Vincent Q Nguyen
(74) *Attorney, Agent, or Firm* — Helen M. Galus; Jennifer L. Riley; Linda B. Blackburn

(57) ABSTRACT

A method for monitoring the structural health of a structure of interest by coupling one or more electroactive polymer fibers to the structure and monitoring the electroactive responses of the polymer fiber(s). Load changes that are experienced by the structure cause changes in the baseline responses of the polymer fiber(s). A system for monitoring the structural health of the structure is also provided.

30 Claims, 1 Drawing Sheet

STRUCTURAL HEALTH MONITORING SYSTEM/METHOD USING ELECTROACTIVE POLYMER FIBERS

Pursuant to 35 U.S.C. §119, the benefit of priority from provisional application 61/151,535, with a filing date of Feb. 11, 2009, is claimed for this non-provisional application.

ORIGIN OF THE INVENTION

The invention was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to monitoring the health of structures. More specifically, the invention is a method and system using electroactive polymer fibers to monitor the health of a structure.

2. Description of the Related Art

Structural health monitoring systems/methods endeavor to provide a real-time "picture" of the structural well being of static structures (e.g., buildings, bridges, etc.) or vehicle structures (e.g., aircraft spacecraft, automobiles, etc.). The health of a structure can be affected by impacts or collisions, a structure's material failure such as delamination, cracks caused by long-term fatigue, or general aging effects. Ideally, the same structural health monitoring system would provide information on all of these failure mechanisms.

SUMMARY OF THE INVENTION

Accordingly, it is an object of the present invention to provide a structural health monitoring system and method.

Another object of the present invention is to provide a system and method that can be used to detect a wide variety of structural damage.

Still another object of the present invention is to provide a structural health monitoring system and method that can be incorporated into structural designs or added to existing structures.

Other objects and advantages of the present invention will become more obvious hereinafter in the specification and drawings.

In accordance with the present invention, a method and system are provided for monitoring the structural health of a structure. One or more electroactive polymer fibers are coupled to the structure. Electroactive responses of the fiber(s) are monitored. Load changes experienced by the structure cause changes in baseline responses of the fiber(s).

DETAILED DESCRIPTION OF THE INVENTION

Figure 1:
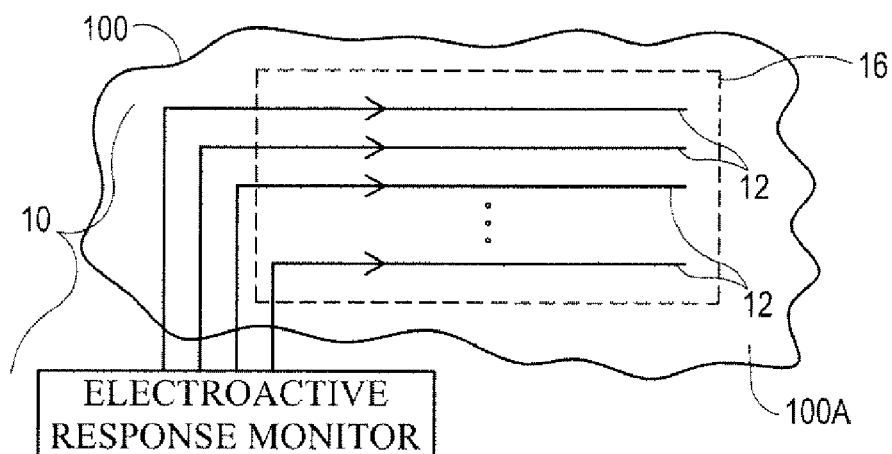
FIG. 1 is a schematic view of a system for monitoring a structure's health in accordance with an embodiment of the present invention.

Referring now to the drawings and more particularly to FIG. 1, a system for monitoring a structure's health in accordance with an embodiment of the present invention is shown and is referenced generally by numeral 10. A portion of a structure to be monitored is referenced by numeral 100. Structure 100 is any static or vehicle structure of interest, or component thereof, and is not a limitation of the present invention. System 10 could be added to an existing structure 10 or incorporated into the initial design thereof without departing from the scope of the present invention.

Figure 2:
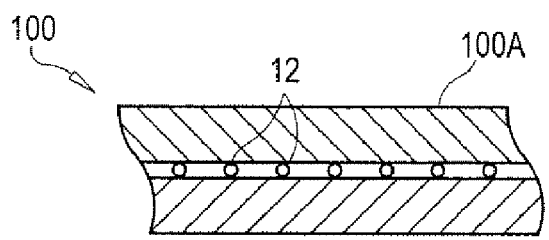
FIG. 2 is a cross-sectional view of a portion of a structure with electroactive polymer fibers embedded therein in accordance with another embodiment of the present invention.

System 10 includes the following two primary components: one or more electroactive fibers 12 and a monitor 14 that can "read" the electroactive response of fibers 12. In general, each of fibers 12 is coupled to a portion of structure 100 that is to be monitored. Such coupling of fibers 12 to structure 100 must be accomplished in a way that allows any loads (e.g., tensile, compressive, etc.) experienced by structure 100 to be coupled to fibers 12. Accordingly, fibers 12 could be attached directly to structure 100, or fibers 12 could be attached to a flexible substrate 16 (illustrated with dashed lines to indicate the optional nature thereof) that was then attached to structure 100. Fibers 12 could be attached to a surface 100A of structure 100 (FIG. 1) or could be embedded within structure 100 as illustrated in FIG. 2. Fibers 12 are typically arranged in a parallel fashion as shown with only a single ply of the array being needed on any area of structure 100.

As mentioned above, each of fibers 12 is an electroactive fiber that generates an electrical signal response when a mechanical force is applied thereto. That is, each of fibers 12 must have been rendered electroactive by a poling process during the manufacture of fibers 12 or using a post-processing technique. For purpose of the present invention, each of fibers 12 can be a polymer fiber with the polymer being an electroactive material such as polyvinylidenefluoride (PVDF), a polymer that more closely resembles structural polymers such as polyimide as long as there are moieties on the polymer that can impart electroactivity, or polymers doped with nanofillers to enable an electroactive response when the fiber is loaded.

The electroactive polymer fibers of the present invention can be made by an electrospinning process. A length (or lengths) of fiber can be cut from the spun fiber, or the electrospinning process can be controlled to control fiber length. In addition, the electrospinning process can be used to control fiber diameter. Note that fiber diameter determines both the amount of force that will be required to generate a response as well as the frequency of the response. Accordingly, fibers 12 in the present invention can be sized and positioned to provide the means to monitor a variety of abrupt or steady changes in loads that affect a structure's health.

An electrospinning process that provides for controlled deposition, controlled alignment, controlled fiber diameter, and the simultaneous poling thereof, is disclosed in U.S. Patent Application No. 2009/0108503, the contents of which are hereby incorporated by reference. If fibers 12 are electrospun using this process, they can be deposited directly onto a structural component or a substrate "mat" that will then be coupled to a structure.

Figure 3:
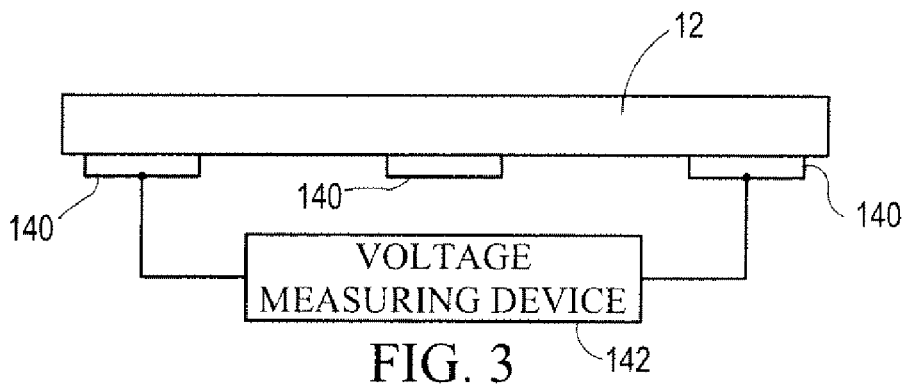
FIG. 3 is a schematic view of a single electroactive polymer fiber with electrodes and a voltage device coupled thereto in accordance with an embodiment of the present invention.

The reading of fiber response provided by monitor 14 can be accomplished in a variety of ways without departing from the scope of the present invention. For example, as illustrated in FIG. 3, each fiber 12 in the present invention can have electrodes 140 coupled thereto with a voltage measuring device 142 hardwired to electrodes 140. A number of spaced-apart electrodes 140 could be coupled to fiber 12 and voltage measuring device 142 could then be coupled to a selected two of electrodes 140 based on the relevant portion of fiber 12 that needs to be monitored.

Figure 4:
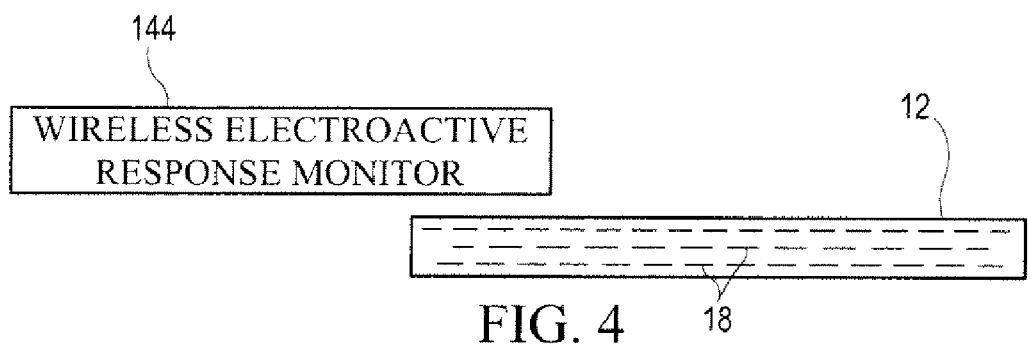
FIG. 4 is a schematic view of a single electroactive polymer fiber with nanofillers incorporated therein for use with a wireless monitor in accordance with another embodiment of the present invention.

In some applications, hardwiring of a voltage measuring device to the fibers may not be practical or desirable. Accordingly, another embodiment of the present invention is illustrated in FIG. 4 where a wireless electroactive response monitor 144 is used to "read" fibers 12. To facilitate such wireless monitoring, each of fibers 12 can have nanofillers 18 (e.g., carbon nanotubes (CNTs), graphene sheets, etc.) included therein. Such nanofillers 18 not only enhance the electroactive response of fiber 12, but they can also serve as an antenna when they are substantially aligned along the length of the fiber 12 as shown. For example, such alignment can be accomplished during the manufacture of fibers 12 if nanofillers 18 are mixed with the base polymer used to make fiber 12, and then fiber 12 is manufactured in accordance with the teachings of the above-reference U.S. Patent Application No. 2009/0108503, whereby the resulting fiber 12 is simultaneously poled with nanofillers 18 being aligned therein.

The advantages of the present invention are numerous. The electroactive polymer fibers are readily tailored in terms of length, diameter and alignment to provide an electroactive load-sensitive sensor for a variety of static and vehicle structures. Once installed, a baseline structural health reading can be performed with subsequent health monitoring being carried out continuously, periodically, randomly, etc., depending on the type of structural ailments that are of concern. The electroactive polymer fibers can be fabricated, poled, and simultaneously emplaced, during a structure's fabrication, or while the structure is already in service. The system can be configured for use with a variety of wired or wireless electroactive response monitors.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method for monitoring structural health, comprising the steps of:
   providing a structure of interest;
   coupling electroactive polymer fibers to the structure, wherein the composition of the electroactive polymer fibers is uniform throughout a cross-section of the fiber; and
   monitoring an electroactive response of said fibers.

2. A method according to claim 1, wherein said step of coupling comprises the step of embedding said fibers in the structure.

3. A method according to claim 1, wherein said step of coupling comprises the step of attaching said fibers to a surface of the structure.

4. A method according to claim 1 wherein said step of coupling includes the step of aligning said fibers to define a substantially parallel arrangement thereof.

5. A method according to claim 1, wherein said step of coupling includes the step of arranging said fibers in a single ply.

6. A method according to claim 1, wherein said step of coupling includes the step of arranging said fibers in a single ply with said fibers being aligned substantially parallel to one another.

7. A method according to claim 1, wherein said step of monitoring comprises the steps of:
   coupling two spaced-apart electrodes to each of said fibers; and
   measuring a voltage between said two spaced-apart electrodes for at least one of said fibers.

8. A method according to claim 1, wherein said fibers have nano fillers embedded therein and aligned along the length thereof, wherein said step of monitoring is performed in a wireless fashion.

9. A method according to claim 1, wherein said step of coupling includes the steps of:
   electrospinning a polymer material to form said fibers; and
   depositing said fibers on the structure during said step of electrospinning.

10. A method according to claim 1, wherein said step of coupling includes the steps of:
    electrospinning a polymer material to form said fibers; and
    poling said material during said step of electrospinning.

11. A method according to claim 1, wherein the uniform material comprises an electroactive material.

12. A system for monitoring structural health, comprising:
    at least one electroactive polymer fiber adapted to be coupled to a structure, wherein the composition of the electroactive polymer fiber is uniform throughout a cross-section of the fiber; and
    means for monitoring an electroactive response of each said fiber wherein changes in said electroactive response associated therewith are indicative of changes in loads being applied thereto.

13. A system as in claim 12, wherein said at least one electroactive polymer fiber comprises a plurality of electroactive polymer fibers.

14. A system as in claim 13, wherein said plurality of fibers are substantially parallel to one another.

15. A system as in claim 13, wherein said plurality of fibers are arranged in a single ply.

16. A system as in claim 13, wherein said plurality of fibers are arranged in a single ply with said fibers being substantially parallel to one another.

17. A system as in claim 12, wherein said means for monitoring comprises:
    at least two electrodes coupled to said at least one electroactive polymer fiber in a spaced apart fashion; and
    a voltage measuring device coupled to said at least two electrodes.

18. A system as in claim 12, further comprising nanofillers within said at least one electroactive polymer fiber and substantially aligned along the length thereof.

19. A system as in claim 18, wherein said nanofillers are selected from the group consisting of carbon nanotubes and graphene sheets.

20. A system as in claim 18, wherein said means for monitoring comprises wireless device.

21. A system according to claim 12, wherein the uniform material comprises an electroactive material.

22. A system for monitoring structural health, comprising:
    a structural element;

a plurality of electroactive polymer fibers coupled to said element, wherein the composition of the electroactive polymer fibers is uniform throughout a cross-section of the fiber; and means for monitoring electroactive responses of said fibers wherein changes in said electroactive responses are indicative of changes in loads being applied to said fibers.

23. A system as in claim 22, wherein said fibers are substantially parallel to one another.

24. A system as in claim 22, wherein said fibers are arranged in a single ply.

25. A system as in claim 22, wherein said fibers are arranged in a single ply and are substantially parallel to one another.

26. A system as in claim 22, wherein each of said fibers comprises an ejectroded fiber, and wherein said means for monitoring comprises a voltage measuring device coupled to each said electroded fiber.

27. A system as in claim 22, further comprising nanofillers within each of said fibers and substantially aligned along the length thereof.

28. A system as in claim 27, wherein said nanofillers are selected from the group consisting of carbon nanotubes and graphene sheets.

29. A system as in claim 27, wherein said means for monitoring measures said electroactive response in a wireless fashion.

30. A system according to claim 22, wherein the uniform material comprises an electroactive material.

* * * * *